(12) United States Patent
Ive et al.

(10) Patent No.: US 12,227,075 B2
(45) Date of Patent: Feb. 18, 2025

(54) CONTENT DISPLAY DEVICE FOR ROAD VEHICLE EQUIPPED WITH TIME MEASUREMENT SYSTEM

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James Mcgrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Maximilian Romani, Modena (IT); Vito Conigliaro, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/499,282

(22) Filed: Nov. 1, 2023

(65) Prior Publication Data
US 2024/0149686 A1    May 9, 2024

(30) Foreign Application Priority Data
Nov. 4, 2022   (IT) ..................... 102022000022725

(51) Int. Cl.
*B60K 35/53*   (2024.01)
*B60K 35/10*   (2024.01)
(Continued)

(52) U.S. Cl.
CPC .............. *B60K 35/53* (2024.01); *B60K 35/10* (2024.01); *B60K 35/22* (2024.01); *B60K 35/50* (2024.01);
(Continued)

(58) Field of Classification Search
CPC ........ B60K 35/53; B60K 35/10; B60K 35/22; B60K 35/50; B60K 35/60; B60K 35/00;
(Continued)

(56) References Cited

U.S. PATENT DOCUMENTS

| 6,448,893 B1 * | 9/2002 | Dobberkau ............ B60K 35/00 340/461 |
| 7,340,333 B2 | 3/2008 | Lenneman et al. |

(Continued)

FOREIGN PATENT DOCUMENTS

| DE | 202020106124 U1 | 1/2021 |
| EP | 3070698 B1 | 7/2019 |
| EP | 3526070 B1 | 12/2020 |

OTHER PUBLICATIONS

Italian Search Report for Application No. 202200022725; Filing Date: Nov. 4, 2022; Date of Mailing: Jun. 15, 2023; 6 pages.

*Primary Examiner* — Keith J Frisby
(74) *Attorney, Agent, or Firm* — CANTOR COLBURN LLP (57) ABSTRACT

Road vehicle comprising a passenger compartment configured to accommodate a driver and at least one passenger alongside the driver; a vehicle dashboard; a steering wheel; a content display device comprises: a support element hinged in the area of a central portion of the vehicle (Continued)

dashboard, at the front between a driver's seat and a passenger's seat; at least one screen mechanically connected to the support element and configured to be visible to a passenger and/or to a driver while driving; a time measurement system, in particular a chronograph; the vehicle comprises mechanical controls arranged, namely mounted, in the area of the steering to give instructions to the time measurement system.

11 Claims, 12 Drawing Sheets

(51) Int. Cl.
*B60K 35/22* (2024.01)
*B60K 35/50* (2024.01)
*B60K 35/60* (2024.01)
*B60K 35/81* (2024.01)
*B62D 1/04* (2006.01)
*B60R 11/00* (2006.01)

(52) U.S. Cl.
CPC .............. *B60K 35/60* (2024.01); *B60K 35/81* (2024.01); *B62D 1/046* (2013.01); *B60K 2360/128* (2024.01); *B60R 2011/0005* (2013.01); *B60R 2011/0085* (2013.01); *B60Y 2200/114* (2013.01)

(58) Field of Classification Search
CPC .. B60K 35/80; B60K 35/81; B60K 2360/128; B60K 2360/782; B62D 1/046; B62D 1/04; B60R 2011/0085; B60R 2011/008; B60R 2011/0042; B60R 2011/0092; B60R 2011/0087; B60R 2011/0005; B60R 11/00; B60R 11/02; B60R 11/0235; B60R 11/0229; B60Y 2200/114
USPC ............................................... 180/90; 701/36
See application file for complete search history.

(56) References Cited

U.S. PATENT DOCUMENTS

| | | | | |
|---|---|---|---|---|
| 2005/0197745 | A1* | 9/2005 | Davis ..................... | B60K 35/00 701/1 |
| 2020/0391669 | A1* | 12/2020 | Fontaeus ................ | B60K 35/00 |
| 2020/0406831 | A1* | 12/2020 | Michel .................. | F16B 5/0266 |
| 2023/0322079 | A1* | 10/2023 | De Ruiter ............. | B60K 35/00 701/36 |

* cited by examiner

FIG. 12

CONTENT DISPLAY DEVICE FOR ROAD VEHICLE EQUIPPED WITH TIME MEASUREMENT SYSTEM

CROSS-REFERENCE TO RELATED APPLICATIONS

This patent application claims priority from Italian patent application no. 102022000022725 filed on Nov. 4, 2022, the entire disclosure of which is incorporated herein by reference.

TECHNICAL FIELD

The invention relates to a road vehicle provided with a time measurement system.

In particular, the invention can advantageously, though not exclusively be applied to a high-performance road vehicle, to which explicit reference will be made in the description below without because of this lacking generality.

BACKGROUND OF THE INVENTION

Generally speaking, road vehicles are provided with a plurality of display devices arranged in the area of the dashboard of the road vehicle.

Historically, each road vehicle comprises at least one display device reserved to the driver, for example the screens or the indicators arranged in the area of the control panel of the vehicle, namely on the dashboard portion interposed between the steering wheel and the windshield.

In recent years, these devices have been supported by other screens (for instance, at least one screen arranged at the centre of the dashboard or a head-up display), which complete the display of information to the driver.

Generally speaking, the use of a central screen with larger and larger dimensions is becoming more and more successful, especially in full electric cars; however, in most cases, said central screens are exclusively provided with tactile controls, which, when driving in sports mode (for example, on a track), make it difficult, if not impossible, for the driver to select a function without being distracted. In particular, when driving on a track, it often happens that a driver wants to keep track of the time needed to cover a lap or a sector of the track. In order to do so, dedicated sensors are sometimes present on the side of the track. However, these sensors are not always enabled for non-professional races and, therefore, drivers need an aid (usually on board the vehicle) that measures the time with a chronometer for each sector and for the lap.

As a matter of fact, with known systems, drivers could not autonomously keep track of times without being distracted from driving, which turns out to be dangerous at high speeds, especially for inexperienced drivers.

Furthermore, said screens generally are integral to the dashboard and, therefore, despite being visible both to the driver and to the passenger, are not, for either of them, an ideal point of view for the information, both for perspective reasons and due to possible light reflections (for example, caused by the sun or by the lights of another vehicle), which significantly reduce the driver's reading quickness.

Therefore, generally speaking, the visibility of vehicle display systems needs to be improved, further allowing the driver to autonomously keep track of the times needed to cover some parts of a track or the entire track.

DESCRIPTION OF THE INVENTION

The object of the invention is to provide a road vehicle, which is at least partially free from the drawbacks described above and, at the same time, is simple and economic to be manufactured.

According to the invention, there are provided road vehicle according to the independent claims attached hereto and, preferably, according to any one of the dependent claims directly or indirectly depending on the independent claims.

The appended claims describe preferred embodiments of the invention and form an integral part of the description.

BRIEF DESCRIPTION OF THE DRAWINGS

Hereinafter, some embodiments of the invention will be described, in order to allow the latter to be better understood, by way of non-limiting example and with reference to the accompanying drawings, wherein.

EMBODIMENTS OF THE INVENTION

Figure 1:
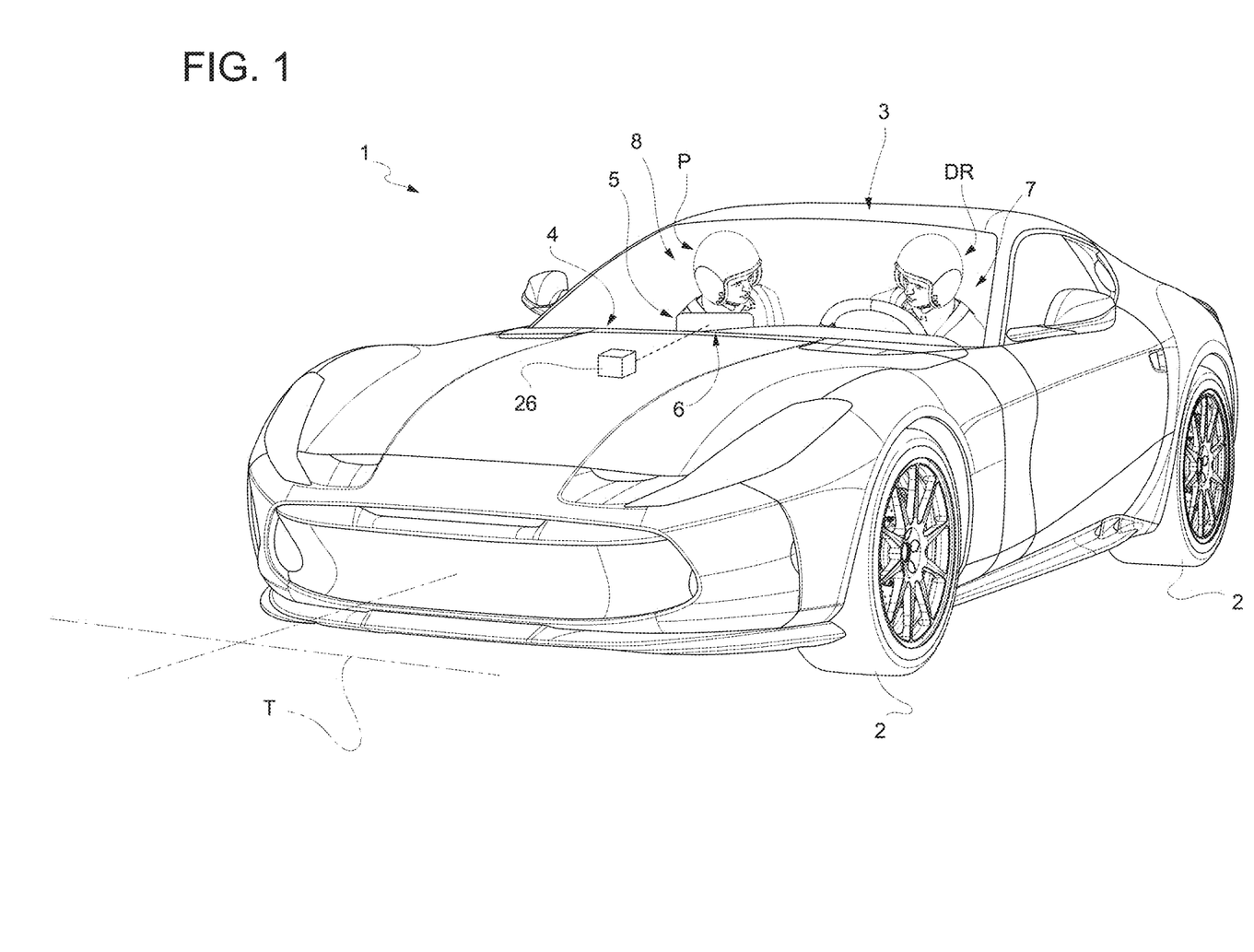
FIG. 1 is a schematic perspective view, with details left out for greater clarity, of a possible embodiment of a road vehicle according to the invention.

In FIG. 1, number 1 indicates, as a whole, a road vehicle provided with two front wheels 2 and with two rear wheels 2 (in particular, drive wheels). The vehicle 1 is provided with a passenger compartment 3, which is designed to accommodate at least a driver DR and, preferably, one or more passengers P, at least one of them seated alongside the driver DR as shown in FIG. 1.

In the figures, the same numbers and the same reference letters indicate the same elements or components with the same function.

For the purposes of the invention, the term "second" component does not imply the presence of a "first" component. As a matter of fact, these terms are only used as labels to improve clarity and should not be interpreted in a limiting manner.

The elements and features contained in the different preferred embodiments, drawings included, can be combined with one another or be isolated from one another, without for this reason going beyond the scope of protection of this patent application, as described hereinafter.

Furthermore, the road vehicle 1 comprises a frame (of the known kind and, therefore, not shown in detail) and a vehicle dashboard 4 on the inside of the passenger compartment and fixed to the frame. The vehicle dashboard 4 is arranged in front of the driver DR and of the possible passenger P.

As shown in the non-limiting embodiments of the accompanying figures, the road vehicle 1 comprises a content display device 5, which is arranged in the area of the vehicle dashboard 4, in particular in a central portion 6 of the vehicle dashboard 4 between a driver's seat 7 and a passenger's seat 8.

The content display device 5 comprises a support element 9, which is configured to be mounted on the central portion 6. The support element 9, in other words, determines the main structure of the content display device 5, namely the portion to which the other components of the device 5 are fixed/fastened.

Furthermore, the display device 5 comprises a screen 10, which is mechanically connected and preferably integral to the support element 9 and is configured to be visible to the driver DR and/or to the passenger P. The screen 10 is of the known kind (for example, a preferably tactile liquid-crystal display) and, therefore, is not described in detail hereinafter.

In particular, the vehicle 1 comprises a steering wheel 30 of the known kind, which is not described in greater detail hereinafter.

The road vehicle 1 advantageously comprises mechanical controls 31 arranged (namely, mounted) in the area of the steering wheel 30. In this way, the mechanical controls 31 can easily be found by the driver DR without having to look away from the road ahead (for example, from the track).

As shown in the non-limiting embodiments of FIGS. 2, 3 and 6-8, the mechanical controls 31 can be operated along a first direction D and a second direction E, both transverse to a plane on which the steering wheel 30 lies.

Advantageously, though not in a limiting manner, the mechanical controls 31 comprise at least a first button 32 and a second button 33, which can respectively be operated through compression (namely, towards the steering wheel) along the first direction D and the second direction E, which is different from the first direction D.

According to some preferred non-limiting embodiments, like the ones shown in FIGS. 2, 3, 6-8 and 10, the first direction D and the second direction E are parallel to one another.

Preferably, though not in a limiting manner, the mechanical controls 31 are arranged along one or more arms 34 connecting a crown 35 of the steering wheel 30 to a central portion (usually connected to the column of the steering wheel 30). In this way, the mechanical controls 31 can even more easily be found by the driver without having to look away from the road ahead. In particular, the thumbs of the driver DR can particularly easily reach the mechanical controls 31 in this position.

Advantageously, though not in a limiting manner, the device 5 comprises a time measurement system 36, in particular a chronograph 37, wherein mechanical controls 31 are configured to provide instructions to the time measurement system 36.

In addition, the mechanical controls 31 can be configured, depending on the driving mode (for example, if it is different from the high-performance driving mode), to give different instructions to other vehicle systems, for example, though not in a limiting manner, to control an openable roof or to enable functions concerning the powertrain system 4. In any case, in the high-performance driving mode, the mechanical controls 31 serve as an adjustment for the time measurement system 36.

According to further non-limiting cases, the driver DR selects, by means of an interface device, for example the screen 10, a preferred and customized use of the mechanical controls 31 in the driving modes other than the high-performance driving mode (namely, to be performed on a track).

Preferably, though not in a limiting manner, the first button 32 is configured to impart a time measurement start/pause command (namely, a start/pause command for a digital or analogue chronometer) and the second button 33 is configured to impart a measurement reset command.

According to some non-limiting embodiments which are not shown herein, the mechanical controls 31 comprise a third button for measuring the lap time (namely, a button that stores the current time value, though carrying on with the measurement). If necessary, this function can also be fulfilled by the second button 33, which, on the contrary, imparts the measurement reset command, when the driver exerts a prolonged pressure upon it.

According to some preferred, though non-limiting embodiments, the time measurement system 36 is analogue and is integrated in the screen 10. Hence particular, the screen has a hole 50 (in the case shown herein, a circular hole), which accommodates the analogue time measurement system 36 (therefore, provided with physical pointers 38 and relative 10 moving mechanisms). More in particular, the hole 50 has a size that is at least the same as (if not larger than) a dial 51 of the chronograph 37 or, anyway, of the time measurement system 36. In this way, the reading quickness and the visibility of the driver DR are improved, thus allowing the driver DR, thanks to the three-dimensional character of the pointers 38, to more easily read the information.

In other non-limiting cases, the time measurement system 36 is completely digital and is integrated in the screen 10, namely is part of the screen 10. In this way, the time measurement system 36 can be more flexible and more customizable.

Figure 11:
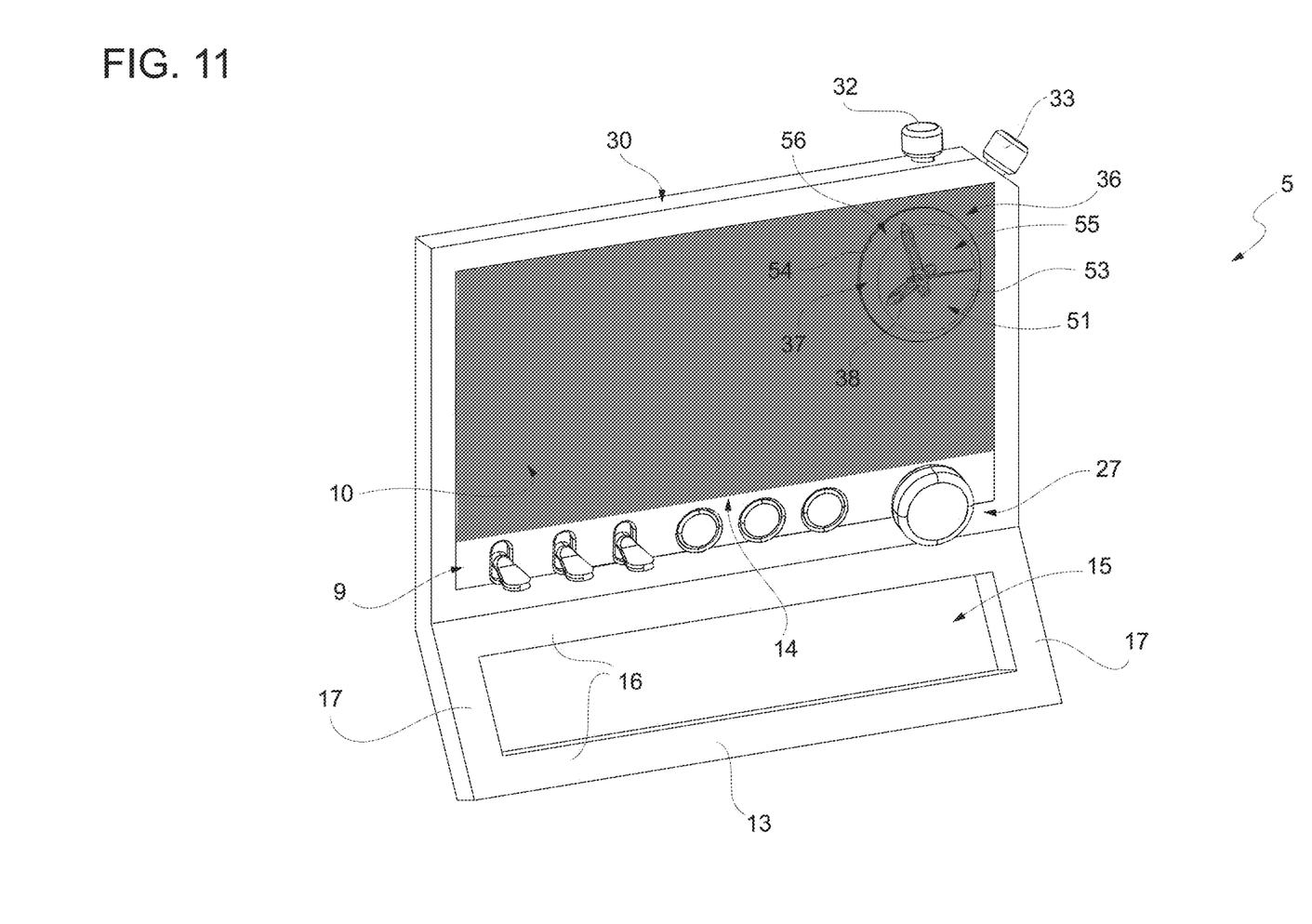
FIG. 11 is a schematic perspective view of a display device according to a further embodiment.
Figure 12:
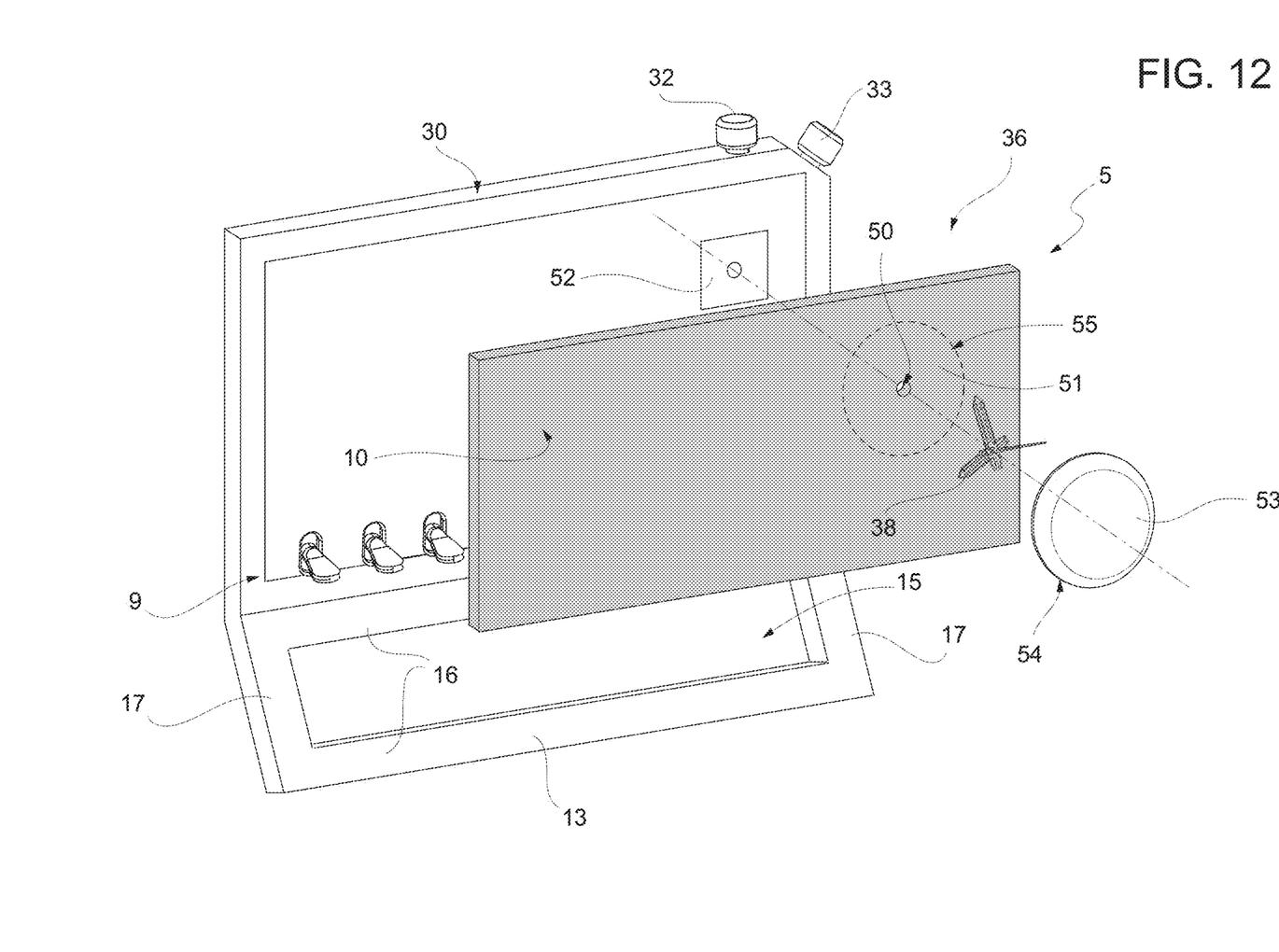
FIG. 12 is an exploded perspective view of the device of FIG. 11.

In further non-limiting cases, in order to obtain both a better visibility and a high customization flexibility and as shown in the embodiment of FIGS. 11 and 12, the time measurement system 36 is partially digital.

In particular, the time measurement system 36 comprises a digital dial 51 and analogue pointers 38. Therefore, the time measurement system 36 comprises a hole 50 having a size that is smaller than the digital dial 51 of the time measurement system 36. In other words, the hole 50 has a smaller size than the area covered by the pointers during 38 during their complete revolution.

Advantageously, though not in a limiting manner, hence, the time measurement system 36 comprises a mechanism 52 (of the known kind and not described in detail hereinafter) to move the pointers 38, in particular to change the movement thereof also based on the mechanical controls 27 and on their position/actuation by the driver DR.

In the non-limiting embodiment of FIGS. 11 and 12, the display system 5 comprises a lens 53 arranged so as to protect (and, preferably, magnify) the pointers 38 of the time measurement system 36. In particular, the lens 53 is mounted on a support 54 (preferably having a shape that is similar to the lens 53, though the latter being independent of the shape of the dial 51) so as to cover a portion 55 of the screen 10 designed to serve as dial 51.

According to some non-limiting embodiments, the portion 55 is integrated in the screen 10 and, therefore, is of the same type as the screen 10 (for example, OLED).

According to other non-limiting embodiments, the portion 55 is accommodated in a dedicated hole of the screen 10 and is of a different kind, for example an electronic ink display to reduce reflections, given its peculiar opacity.

In particular, in any case, in order to permit the movement of the pointers 38, the support 54 determines a slit 56 between the lens 53 and the portion 55 serving as dial 51.

In some non-limiting cases, the lens 53 and the rest of the cover of the screen 10 have different surface treatments or are made of a different material.

In the non-limiting embodiment of FIGS. 11 and 12, the lens 53 is mounted on the support 54 so as to project from the screen 10 (and from its respective protection glass).

Advantageously, though not in a limiting manner, the content display device 5 comprises a moving system 11, which, on one side, is hinged to the support element 9 and, on the other side, is hinged to dashboard 4 so as to alternately rotate the screen 10 towards the driver DR. In this way, together with the disclosure above, the mechanical controls 31 can more easily be reached by driver DR, who can then place them in a preferred position.

Figure 2:
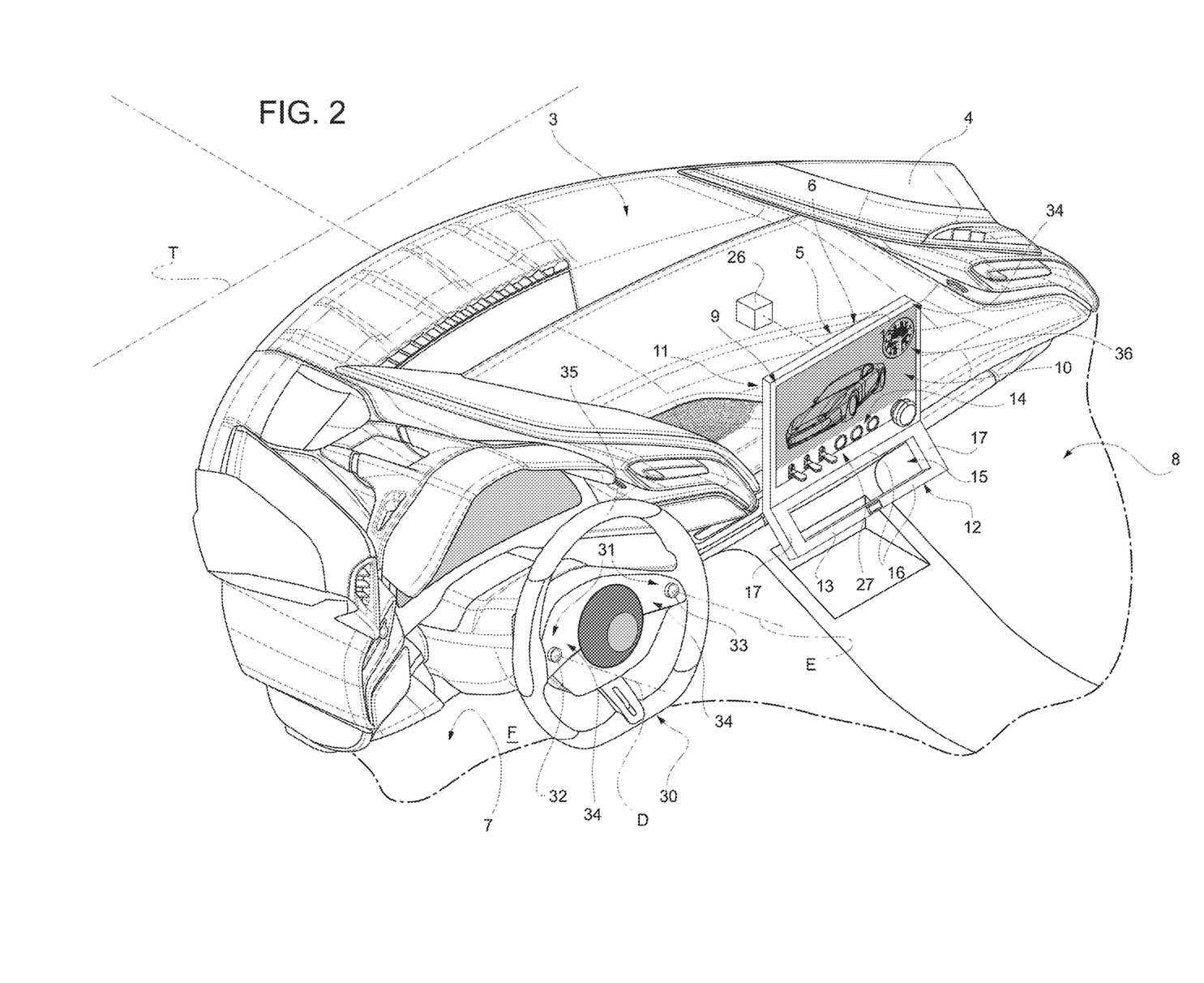
FIG. 2 is a schematic perspective view of part of the inside of the passenger compartment of the vehicle of FIG. 1, showing a central display device in a first position.
Figure 3:
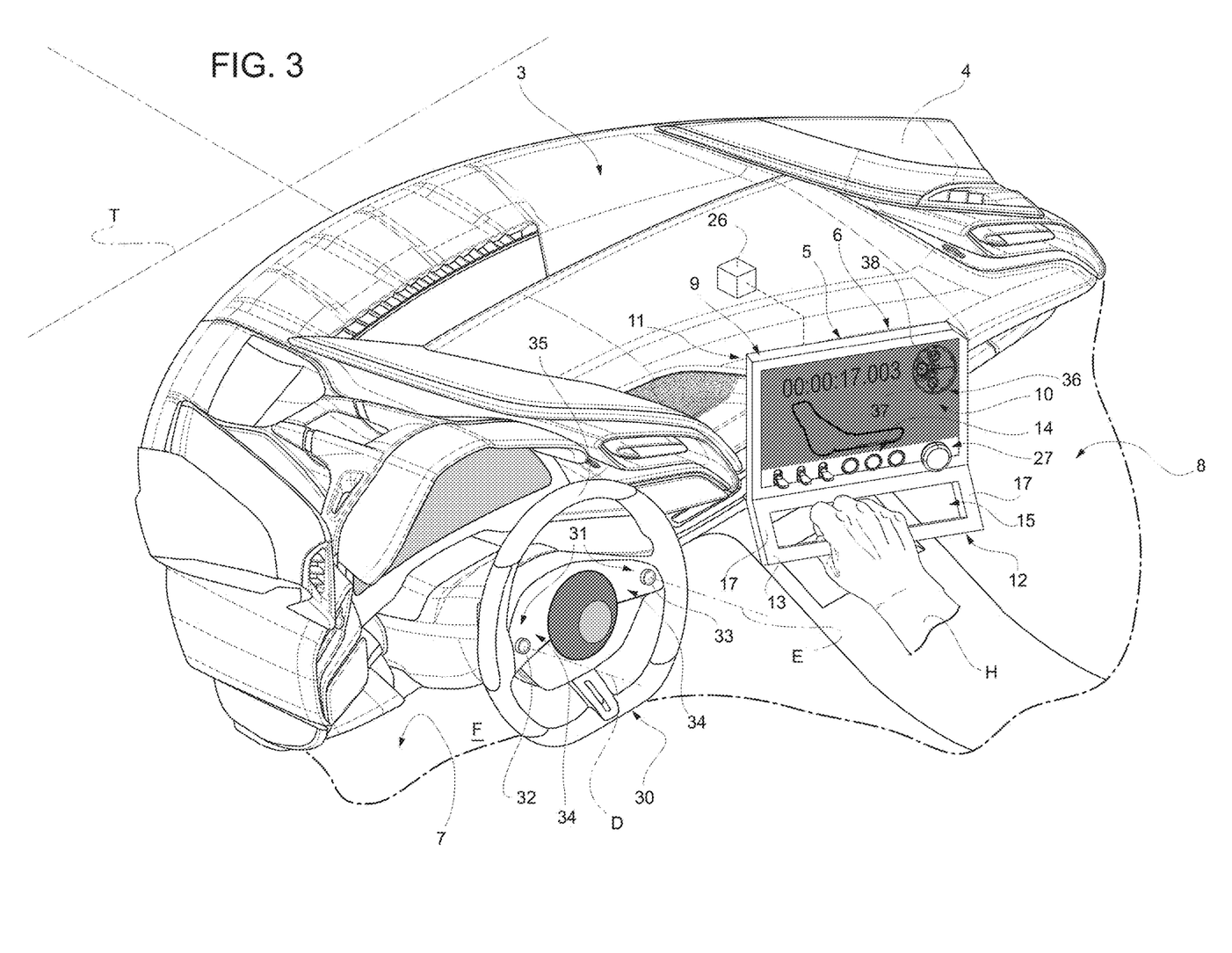
FIG. 3 is a schematic perspective view of part of the inside of the passenger compartment of the vehicle of FIG. 1, showing the central display device of FIG. 2 in a second position.

In particular, the moving system 11 is any kinematic mechanism that allows the support element 9 and, hence, the screen 10 to shift from a first configuration, in which the screen 10 is parallel to a transverse axis T of the road vehicle 1 (namely, the configuration of FIG. 2), to at least a second configuration, in which the screen 10 is inclined towards the driver DR (as shown in FIG. 3).

Therefore, in particular, the moving system 11 is configured to cause the support element 9 to rotate around an axis A, B at least partially transverse (in particular, substantially perpendicular or, anyway, at least at an angle of 70°) relative to a floorboard F of the road vehicle 1.

Preferably, though not in a limiting manner, the display device 5 comprises a handling element 12 configured to be grabbed by hand H of the driver DR (as shown in the non-limiting embodiment of FIG. 3) and/or of the passenger P to rotate the support element 9 at least between the second configuration, in which the screen faces the driver DR, and the third configuration, in which the screen faces the passenger P, (or vice versa) or to move the support element 9 from these configurations back to the first configuration with the screen parallel to the axis T (namely, parallel to the surface of the vehicle dashboard 4).

According to some preferred non-limiting embodiments, the handling element 12 comprises a handle 13, which is integral to the support element 9 and is arranged under the screen 10, namely under a lower side 14 of the screen 10.

Preferably, though not in a limiting manner, the handle 13 is manufactured as one single piece together with the support element 9.

In particular, the handle 13 is obtained by means of a through opening 15 of the support element 9 configured to accommodate the hand H of the driver DR and/or the passenger P.

Figure 4:
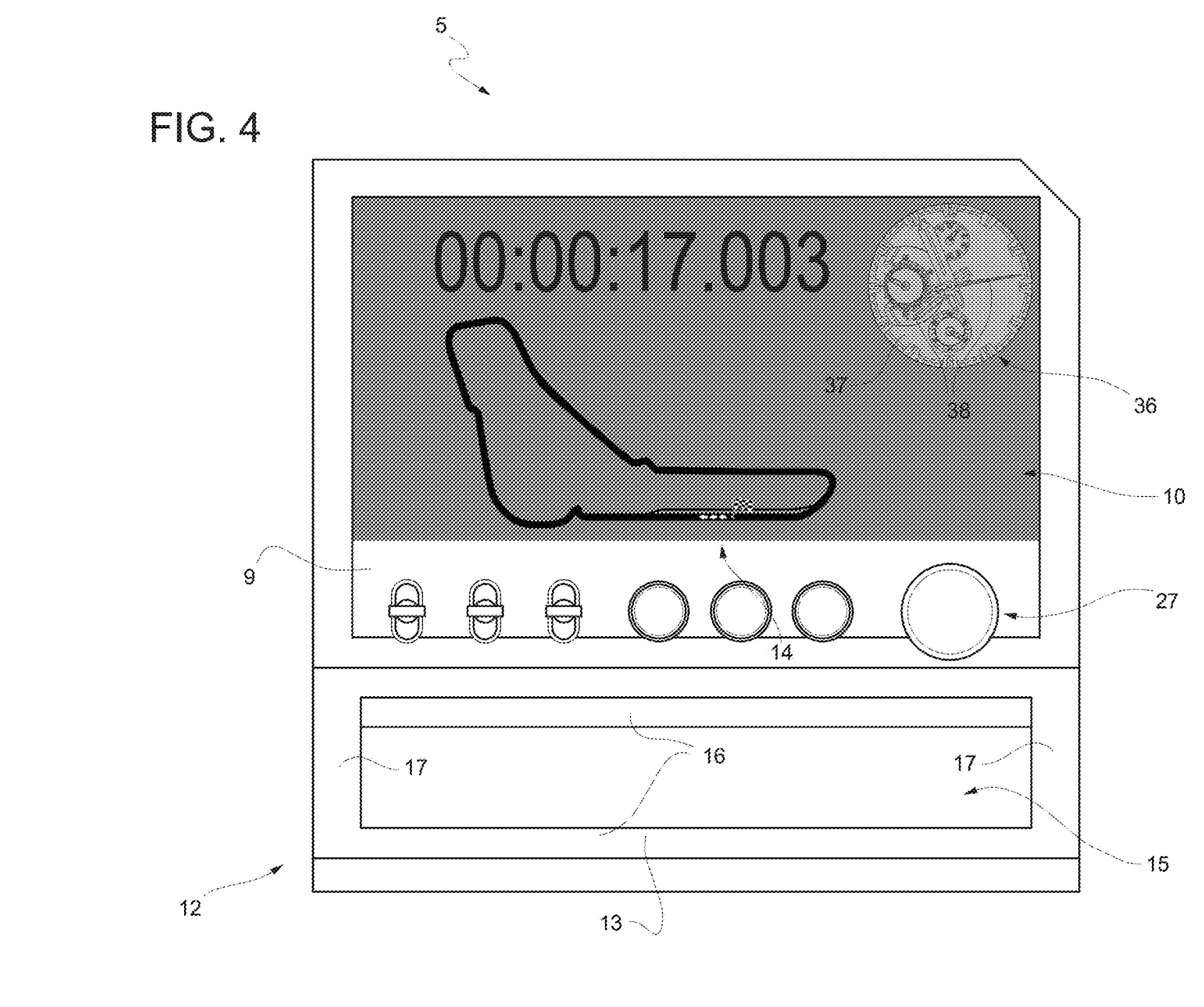
FIG. 4 is a schematic front view of the display device of FIGS. 2 and 3.

In the non-limiting embodiment of FIGS. 2 to 4, the through opening 15 has a symmetrical shape, delimited by a closed curve.

Figure 6:
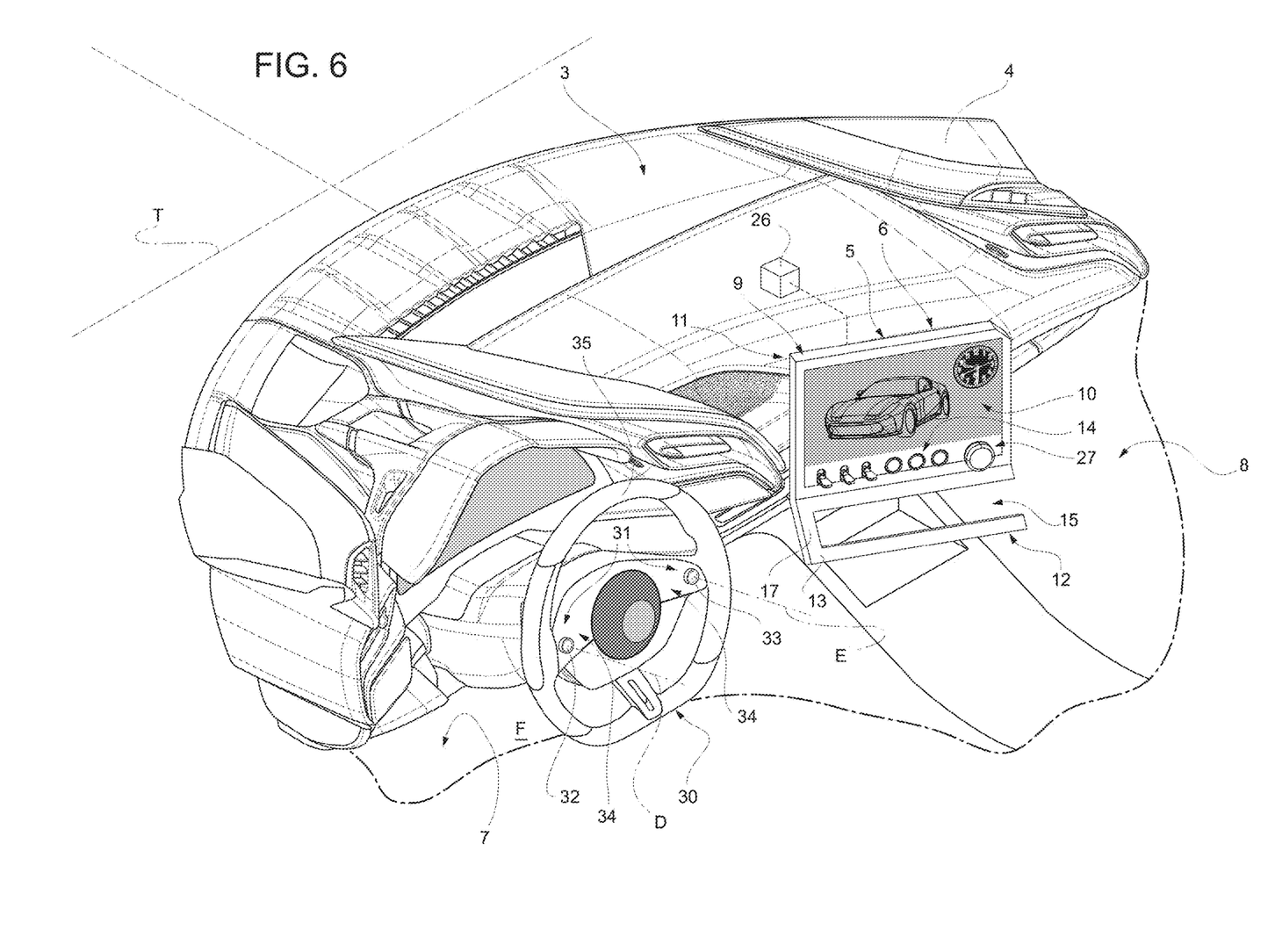
FIGS. 6 and 7 are schematic perspective views of part of the inside of the passenger compartment of the vehicle of FIG. 1, showing a central display device comprising a handling element according to further variants.
Figure 7:
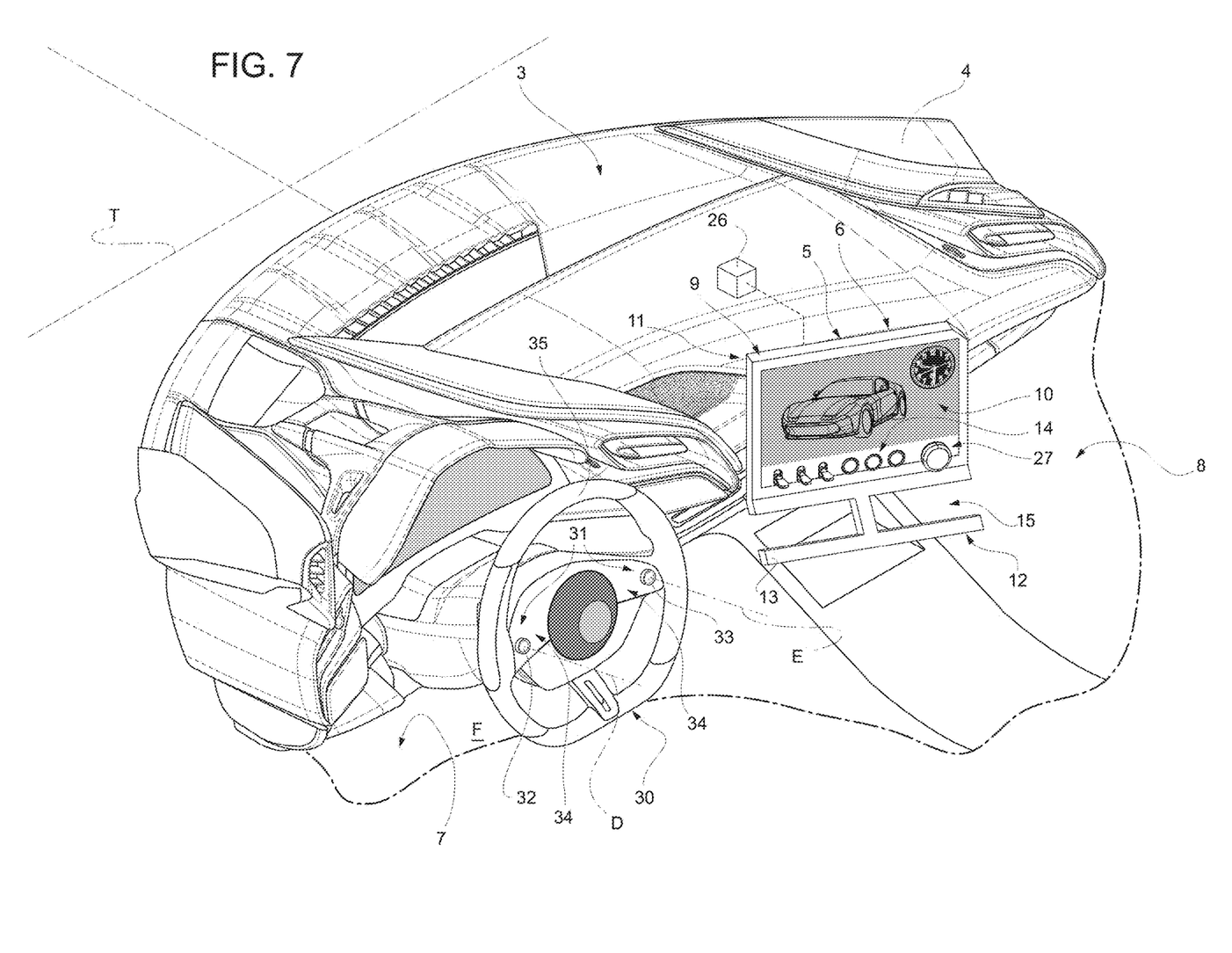
Figure 8:
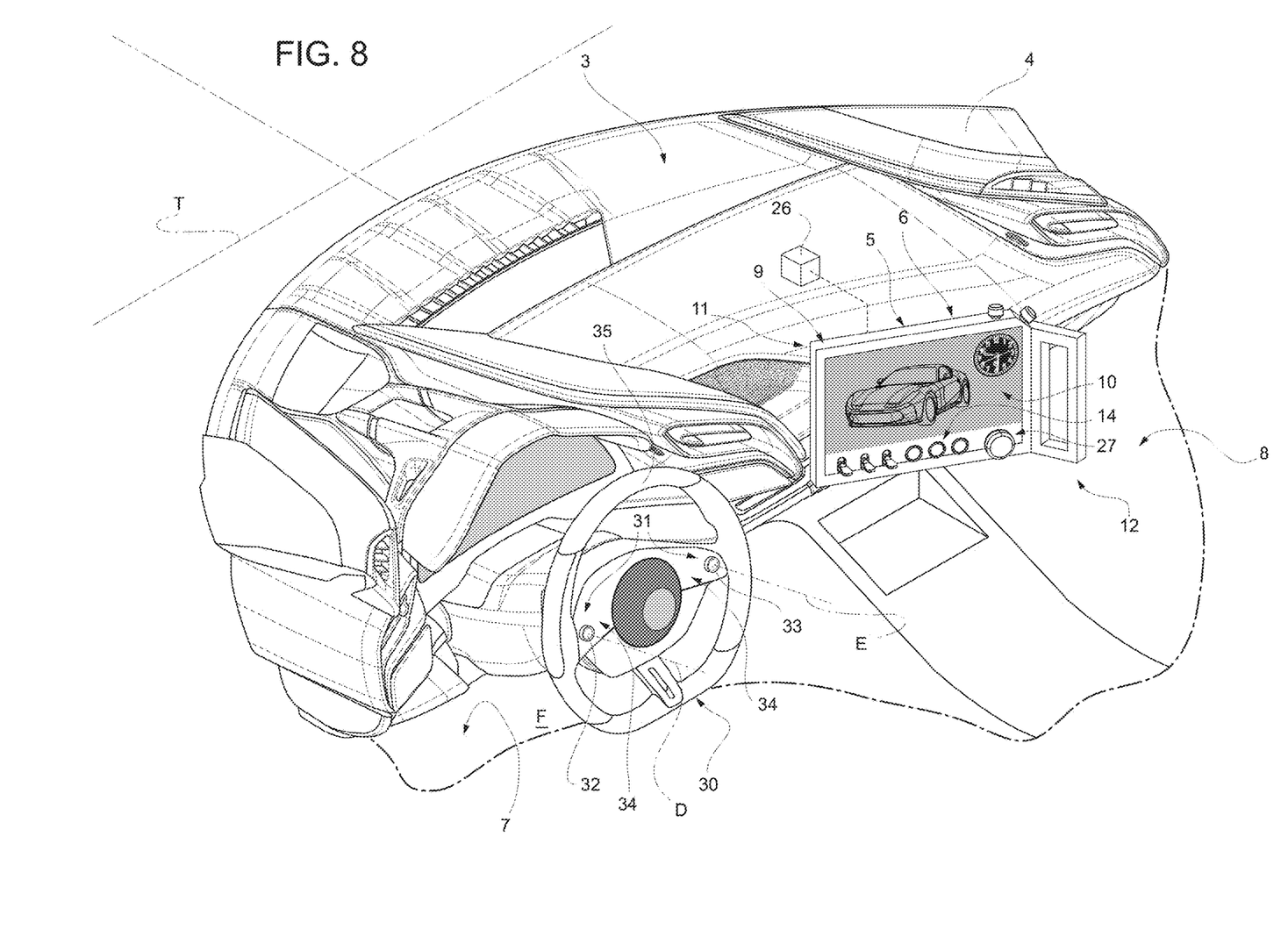
FIG. 8 is a schematic perspective view of part of the inside of the passenger compartment of the vehicle of FIG. 1, showing a central display device comprising a handling element in a different position compared to FIG. 2.

In other non limiting embodiments, like the ones shown in FIGS. 6 and 7, the through opening 15 has an asymmetrical shape (FIG. 6) and/or is delimited by an open curve (FIGS. 6 and 7).

Preferably, though not in a limiting manner, the opening 15 comprises two opposite straight portions 16, which are connected to one another by two curved portions 17, preferably circular ones (alternatively, as shown herein, the portions 17 can also be straight, thus generating a rectangular through opening 15).

Figure 5:
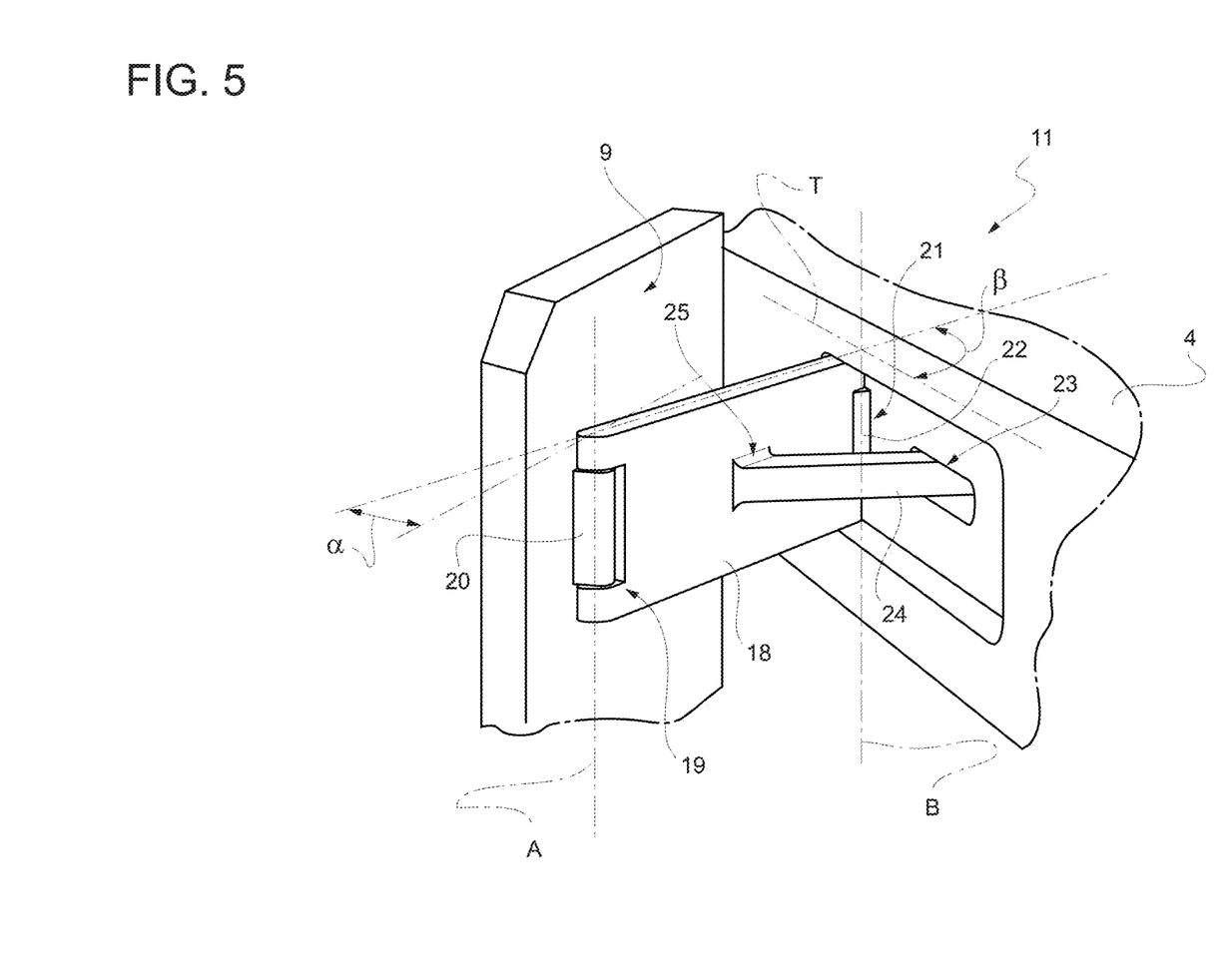
FIG. 5 is a schematic perspective view of a detail of the mechanism connecting the display device of FIGS. 2 to 4 to the vehicle dashboard.

According to the non-limiting embodiment of FIG. 5, the moving system 11 comprises at least one swing arm 18, a first end 19 thereof being hinged, by means of a first hinge 20, to the support element 9, and a second end 21 thereof being hinged, by means of a second hinge 22, to the dashboard 4 of the road vehicle 1.

In particular, the first hinge 20 is integral to the support element 9 and is configured to rotate (circularly, with the swing arm 18 as radius) around the second hinge 22, which is (once mounted) integral to the dashboard 4 of the road vehicle 1.

Advantageously, though not in a limiting manner, the first hinge 20 and the second hinge 22 rotate around a first axis A and around a second axis B, respectively, which are at least partially vertical.

Preferably, though not in a limiting manner, the axis A and the axis B are parallel to one another.

According to some non-limiting embodiments which are not shown herein, the moving system 11 comprises a third hinge to allow the screen 10 to rotate around a substantially horizontal axis. In this way, the driver DR or the passenger P can orient the screen 10 also based on their height, for an ideal display of information.

According to the non-limiting embodiment of FIG. 5, the moving system 11 further comprises a bearing element 23, in particular comprising a bearing arm 24, which is connected to an end 25 of the swing arm 18 and is configured to distribute the weight of the display device 5 in a zone other than the sole second hinge 22. In this way, the stress to which the second hinge 22 is subjected is reduced, thus extending its life and increasing its precision.

As mentioned above, advantageously, though not in a limiting manner, the first hinge is configured to generate a first relative rotary movement between the support element 9 and the swing arm 18 around the rotation axis A and the second hinge is configured to generate a second relative rotary movement between the swing arm 18 and the vehicle dashboard 4 around the rotation axis B.

Advantageously, though not in a limiting manner, the relative movement permits the rotation around the axis A by a first angle $\alpha$ and the second relative movement permits the rotation around the axis B by a second angle $\beta$. In particular, the first angle $\alpha$ and the second angle $\beta$ are different from one another. Preferably, though not in a limiting manner, the first angle $\alpha$ is greater than the second angle $\beta$.

In other words, the angle $\alpha$ corresponds to the angle comprised between a longitudinal axis of the swing arm 18 and a longitudinal axis of the support element 9 (as shown in FIG. 5). Accordingly, the angle $\beta$ corresponds to the angle comprised between the longitudinal axis of the swing arm 18 and the transverse axis T or the axis of the surface of the vehicle dashboard 4 (which is also shown in FIG. 5). In other words, the angles $\alpha$ and $\alpha$ are the angles of the respective relative movements starting from the first configuration (shown in FIG. 2), in which the dashboard 4, the swing arm 18 and the support element 9 are aligned with one another.

Hence, in particular, the moving system 11, not in a limiting manner, is a system with at least two degrees of freedom (resulting from the hinges 20 and 22 in the embodiment of FIG. 5).

Figure 9:
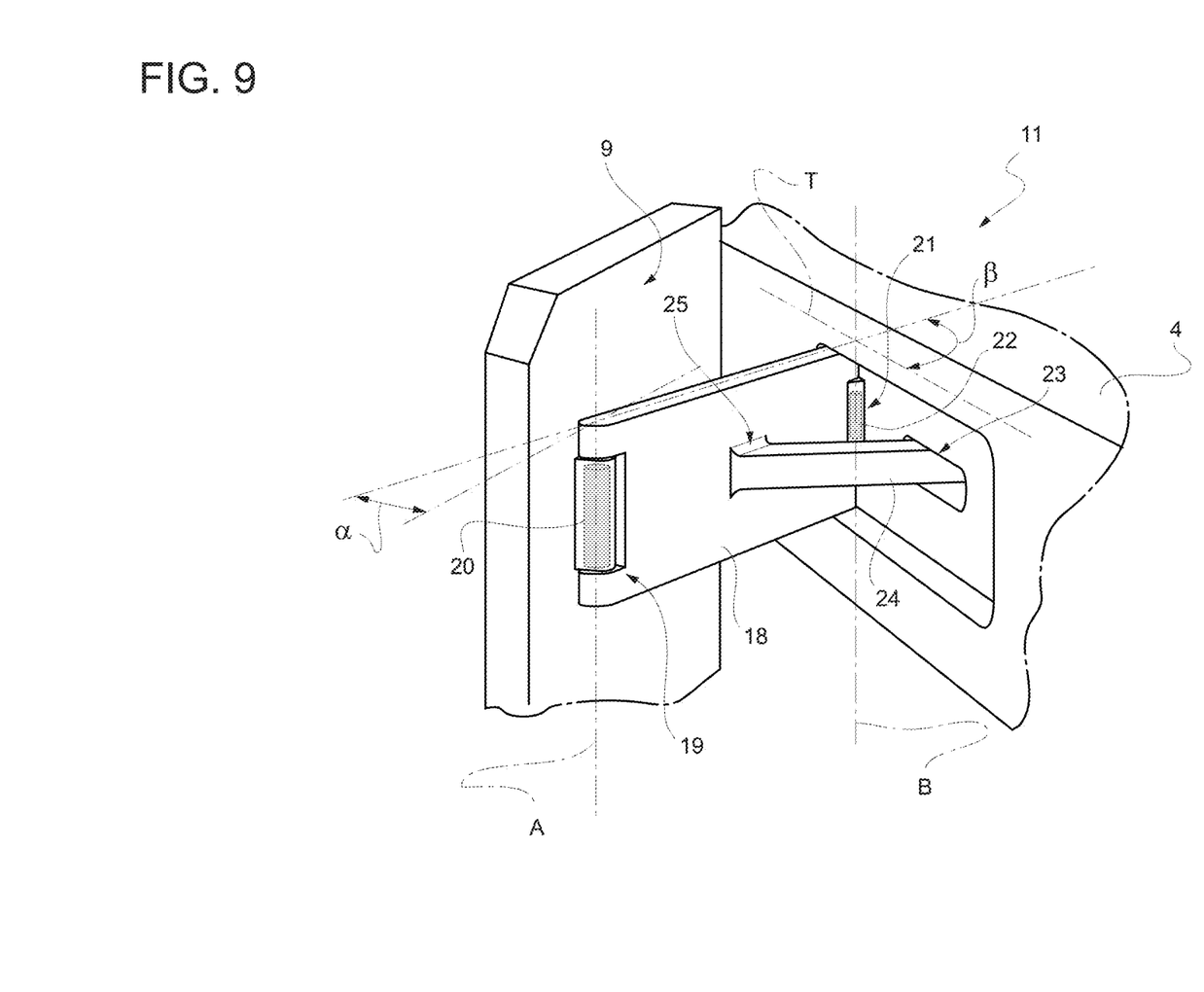
FIG. 9 is a schematic perspective view of a further embodiment of the detail of the mechanism of FIG. 5.

Advantageously, though not necessarily and according to the non-limiting embodiment of FIG. 9, the moving system 11 comprises at least one, preferably two locking systems (not shown). The locking systems (not shown) are configured to hold the display device 5, namely the support element 9 in position. In this way, it is possible to avoid a sudden repositioning (which can harm the driver DR) of the display device 5 in case of extreme vehicle dynamics (for example, during a braking) or, even worse, in case of an accident.

In some non-limiting cases, the locking system (not shown) is a mechanical system comprising springs and/or dampers, which exclusively permit slow movements of the moving system 11.

In other non-limiting cases, the locking system (not shown) comprises a servo-motor, which, for example, enables the movement of the moving system 11 only below a given speed or following a release command of the driver DR.

According to the disclosure above, preferably, the display device 5, in particular in the area of the handling element 12, namely of the handle 13, as shown in the non-limiting embodiment of FIG. 2, comprises at least one release system (not shown), which allows the moving system 11 to be released from the locking system (not shown) so that it can freely move the support element 9.

For instance, advantageously, though not necessarily, the release system (not shown) is configured to enable the movement of the servo-motors of the locking system (not shown) so as to move the support element 9 around the hinges 20 and 22.

According to some preferred non-limiting embodiments, the road vehicle 1 further comprises a control unit 26, which is configured to detect the actuation of the mechanical controls 31 and to change the contents displayed by the display device 5 according to said actuation.

According to some preferred non-limiting embodiments, the support element 9 further comprises further mechanical controls 27, for example levers, buttons or knobs, which are interposed between the handle 13 and the screen 10. In this way, the driver DR can also use these controls (besides the controls 31) in an easy manner and without distractions, using the handle 13 as a reference and/or support and perceiving, through touch, the activation of the control (unlike what would happen with a tactile control on the screen 10).

Figure 10:
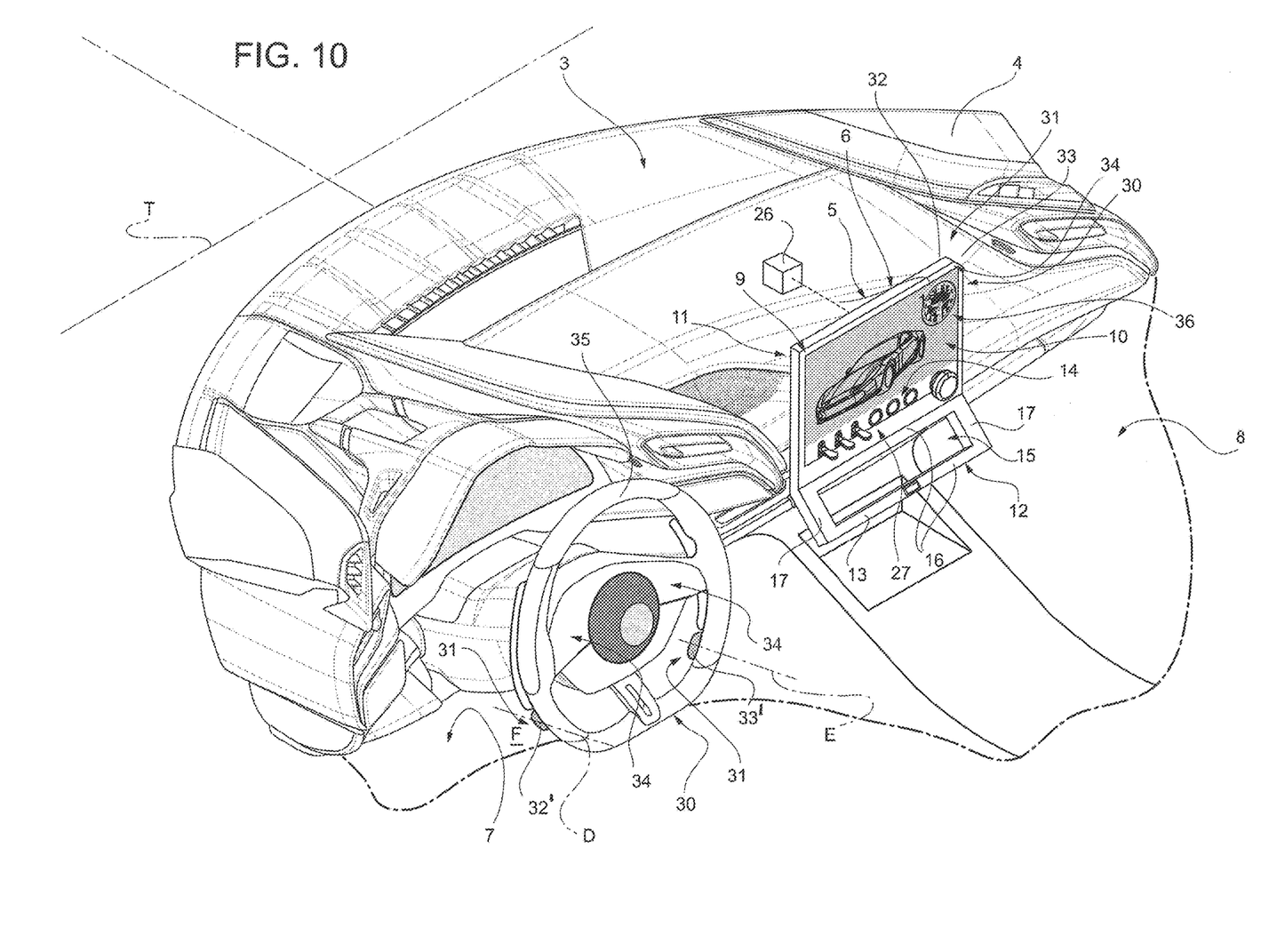
FIG. 10 is a schematic perspective view of part of a further embodiment of the inside of the passenger compartment of the vehicle of FIG. 1.

In the non-limiting embodiment of FIG. 10, the mechanical controls 31 are arranged behind the steering wheel 30 for the driver DR; in particular, instead of the buttons 32 and 33 there are two paddles 32' and 33' having the same functions. In this way, the paddles 32' and 33' can be operated by the driver DR while his/her hands rest on the steering wheel 30 in the normal driving position. In particular, the (left and right) paddles 32' and 33' have mechanical features that are similar to the ones of normal shifting paddles and can be installed in their position, in case of a vehicle 1 with an automatic transmission, or under them, as shown in the non-limiting embodiment of FIG. 10.

The items of information given above and relating to the buttons 32 and 33 also apply to the paddles 32' and 33'.

In use, while driving, the driver DR can operate the buttons 32 and 33 (or the paddles 32' and 33') for the measurement of the track time, without looking away from the road. As a matter of fact, the position and the different operating hand allow the driver to not have doubts on the button that he/she is about to press and, hence, start, stop or reset the time measurement without distractions and in a quick manner.

Even though the invention described above specifically relates to a precise embodiment, it should not be considered as limited to said embodiment, for its scope of protection also includes all those variants, changes or simplifications covered by the appended claims, such as for example a different type of road vehicle (for instance, a front-drive vehicle), a different conformation of the passenger compartment, different moving systems, a different kind of screen (for instance, with integrated mechanical controls 27), etcetera.

The vehicle described above has numerous advantages.

First of all, it reduces the distraction of the driver to look at vehicle data and information, for example the time of the measurement system.

Furthermore, at the same time, it allows the chronograph to be operated in a user-friendly and precise manner, without having to look away from the road ahead.

In addition, the driver's safety is ensured, preventing the display device from hitting or hurting him/her in case of an accident or, anyway, preventing it from moving from the ideal position found, for example when the vehicle is parked, which would be particularly difficult to find again while driving the vehicle, especially during a race.

LIST OF THE REFERENCE NUMBERS OF THE FIGURES 1 vehicle
2 wheels
3 passenger compartment
4 dashboard
5 display device
6 central portion
7 driver's seat
8 passenger's seat
9 support element
10 screen
11 moving system
12 handling element
13 handle
14 lower side
15 opening
16 straight portions
17 curved portions
18 swing arm
19 first end
20 first hinge
21 second end
22 second hinge
23 bearing element
24 bearing arm
25 end
26 control unit
27 mechanical controls
30 steering wheel
31 mechanical controls
32 first button
32' paddle
33 second button 33' paddle
34 steering wheel arms
35 crown
36 time measurement system
37 chronograph
38 pointers
50 hole
51 dial
52 mechanism
53 lens
54 lens support
55 screen portion
56 slit
A axis
B axis
D direction
E direction
DR driver
F floorboard
H driver's hand
P passenger
T transverse axis
α angle
β angle

The invention claimed is:

1. Road vehicle (1) comprising
four wheels (2), of which at least one pair of wheels (2) is driven;
a passenger compartment (3) configured to accommodate a driver (DR) and at least one passenger (P) alongside the driver (DR);
a vehicular dashboard (4);
a steering wheel (30);
a displaying content device (5);
wherein the displaying content device (5) comprises:
a support element (9) hinged at a central portion (6) of the vehicular dashboard (4), frontally between a driver's position (7) and a passenger's position (8) (P);
at least one screen (10), mechanically connected to the support element (9) and configured to be visible to the at least one passenger (P) and/or the driver (DR) while driving;
a time measurement system (36); and
mechanical controls (31) arranged at the steering wheel (30) to give instructions to the time measurement system (36).

2. Vehicle (1) according to claim 1, wherein the mechanical controls (31) comprise at least a first button (32) or a first lever (32') for imparting a measurement start/pause command and at least a second button (33) or a second lever (33') for imparting a measurement reset command.

3. Vehicle (5) according to claim 2, wherein the first button (32) or the first lever (32') and the second button (33) or the second lever (33'), are operable respectively in compression along a first direction (D) and a second direction (E), different from the first direction (D).

4. Vehicle (1) according to claim 1, wherein the mechanical controls (31) are operable respectively along a first direction (D) and a second direction (E), which are parallel to each other and perpendicular to a plane on which the steering wheel (30) lies.

5. Vehicle (1) according to claim 1, wherein the time measurement system (36) is at least partially analogue and is integrated in the screen (10).

6. Vehicle (1) according to claim 1, wherein the mechanical controls (31) are arranged along one or more arms (34) connecting a crown (35) of the steering wheel (30) to a central portion so as to be operated by the driver while keeping his/her hands on the steering wheel (30).

7. Vehicle (1) according to claim 1 further comprising a control unit (26) configured to detect actuation of the mechanical controls (31) and vary the contents displayed by the display device (5) according to said actuation.

8. Vehicle (1) according to claim 1 further comprising a handling system (11) hinged to the support element (9) and to the vehicular dashboard (4) for alternately rotating the screen (10) towards the driver (DR).

9. Vehicle (1) according to claim 8, wherein the handling system (11) comprises at least one swing arm, of which a first end (19) is hinged, by means of a first hinge (20), to the support element (9), and a second end (21) is hinged, by means of a second hinge (22), to the vehicular dashboard (4) of the road vehicle (1).

10. Vehicle (1) according to claim 9, wherein the first hinge (20) is integral with the support element (9) and is configured to rotate around the second hinge (22), which is configured to be integral with the vehicular dashboard (4) of the road vehicle (1).

11. Vehicle (1) according to claim 1, wherein the time measurement system is a chronograph.

* * * * *